Figure 1:
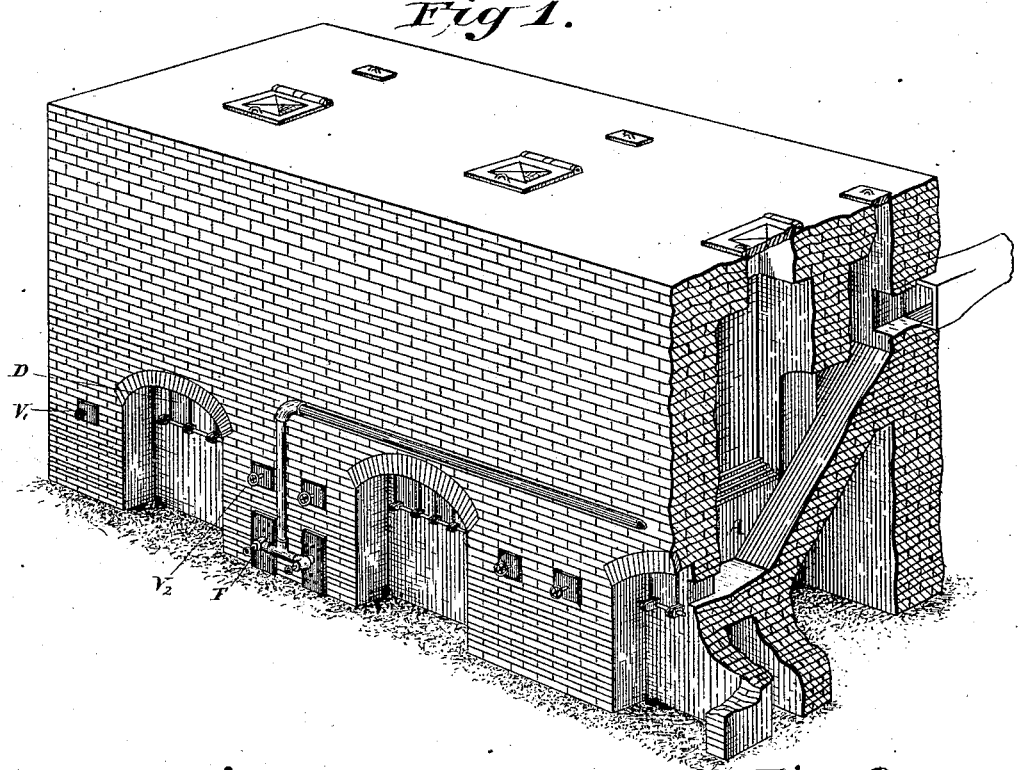

(No Model.)  3 Sheets—Sheet 1.

J. ZELLWEGER.
GAS PRODUCER.

No. 282,025.  Patented July 24, 1883.

Attest:
Geo. T. Smallwood Jr.
C. T. Belt.

Inventor,
John Zellweger.
By Paine & Ladd, attys (No Model.)  J. ZELLWEGER.  3 Sheets—Sheet 2.
GAS PRODUCER.

No. 282,025.  Patented July 24, 1883.

Attest:
Geo. T. Smallwood Jr.
C. J. Belt

Inventor,
John Zellweger
By Paine & Ladd,
Atty's.

(No Model.) 3 Sheets—Sheet 3.

J. ZELLWEGER.
GAS PRODUCER.

No. 282,025. Patented July 24, 1883.

Attest:
Geo. T. Smallwood Jr.
C. T. Belt

Inventor,
John Zellweger
By Paine & Ladd,
Atty's

UNITED STATES PATENT OFFICE.

JOHN ZELLWEGER, OF CHICAGO, ILLINOIS.

GAS-PRODUCER.

SPECIFICATION forming part of Letters Patent No. 282,025, dated July 24, 1883.

Application filed March 15, 1883. (No model.)

*To all whom it may concern:*

Be it known that I, JOHN ZELLWEGER, a citizen of the United States, residing at Chicago, in the county of Cook and State of Illinois, have invented certain new and useful Improvements in Gas-Producers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide an effective process and simple apparatus for the production of heating, illuminating, and other gases, especially that known as "water-gas," which gas is the result of the decomposition of water when in the form of steam, due to its immediate contact with a highly-heated incandescent substance, such as coal.

It is well-known that a large portion of the heating-gas produced from fuel in a gas-generator consists of carbonic oxide. The oxygen necessary for the production of this gas is obtained either from air or from water when in the form of steam, or from both combined. When air alone is used the gas produced is always diluted by nitrogen, which, being a neutral gas, greatly depresses the heating-power of the fuel-gas. No such deterioration takes place when the oxygen is obtained from water; but in order to do so a considerable amount of heat has first to be expended, not only in the transformation of water into steam, but also for superheating the same and then decomposing it into its two elements—oxygen and hydrogen. Of the amount of heat expended in superheating and decomposing the steam, only a part is regained in the producer by the combination of carbon with the liberated oxygen. Therefore, in order to make this process of obtaining oxygen from steam continuous, it is necessary to produce a certain amount of heat by combustion of carbon with oxygen from air and to apply the same for superheating the steam. This heat is generally produced in the generator itself, and for this purpose air is introduced into the incandescent fuel in the producer either simultaneously with the steam, or air and steam are introduced separately at alternate periods. Of these two methods only the first one furnishes a regular supply of gas and is applicable for industrial purposes; but its application, as heretofore known and practiced, does not fully develop its merits, and often works injury instead of benefit. The only known practice is to introduce air and steam into the producer in continuous currents, generally mixed and as a blast, through one or more openings. The wet steam of this mixture, striking continually certain portions of the burning fuel, chills this before it is consumed. The lower portion of the producer then becomes cool and the upper hot, and clinkers are apt to form high up in the producer. The results are waste of fuel in the ashes, failing in the quality of the gas, and disturbances in the operation of the producer. In order to avoid these objectionable features, I have devised another mode of introducing air and steam simultaneously into the producers. It consists in blowing a mixture of air and steam periodically through each one of two or more blast-ports, or through each one of two or more sets of blast-ports, laterally into the burning fuel in the combustion-chamber of a producer, thereby consuming fuel and producing heat periodically in different parts of the combustion-chamber, and transferring it by means of the force of the blast laterally to other parts of the combustion-chamber. In other words, the blast may enter the combustion-chamber through one or more but not through all the ports at a time, and is periodically changed to other ports, either one by one or in sets of two or more. The steam in the mixture blown into the combustion-chamber is superheated by contact with the burning fuel and then decomposed, the fuel exposed to the blast losing heat and becoming chilled. The oxygen of the steam and that from the accompanying air combine with the carbon of the fuel and produce a certain amount of heat, which is partly taken up by the products of combustion and the admixed gases—hydrogen and nitrogen. These several gases are, by the force of the blast, propelled forward in an approximately horizontal direction to parts of the combustion-chamber where there is no blast coming in, and from there upward through the body of fuel in the producer, depositing heat wherever they pass. When in front of a blast-port or of a set of blast-ports, the fuel is consumed or chilled below a certain temperature by the incoming steam; or, when ashes and clinkers have accumulated, the blast is changed from this to another port or set of ports, in the neighborhood of which the fuel had in the meanwhile been heated to a high degree by the passing hot gases. Here the superheating and decomposing of steam and the burning of fuel, &c., take place, as in the first case, and after a certain period the blast is again changed, and so on. The carbonic acid formed by the burning of the fuel in the combustion-chamber is reduced to carbonic oxide—the desired fuel-gas—as it passes forward and upward through the hot coke. The hydrogen gas liberated either escapes free or combines with certain hydrocarbons that were driven out of the fresh fuel in the upper part of the producer. The mixture of the several gases produced in the generator then escapes in a continuous current, as heating-gas of a uniform quality, through an outlet into the gas-flue, for consumption. The heating-gas produced in the manner described contains only a minimum quantity of nitrogen, since the amount of air introduced into the producer is not more than what is required to produce the heat necessary for superheating the steam consumed and to replace the heat that escapes with the outgoing gases and the heat lost through the walls by radiation. Thus the lower portion of the producer remains hot, and as a consequence the production of gas continues regular. The transferring of heat from one part of the combustion-chamber to other parts by means of a blast is also an effective method of "bringing down" any clinkers that have formed in the combustion-chamber and adhere to its walls as a hard mass. These clinkers are softened by the effect of the heat and settle down toward the bottom, where they can be easily removed through the fire-doors. For this latter process a blast of a mixture of steam and air, or of air alone, can be used.

A modification of the described method of introducing air and steam into a producer would be to introduce the two gases not as a mixture, but in separate jets, issuing simultaneously from air-ports and steam-ports that are arranged in two or more sets, both kinds of ports of one set being located near each other, either in the sides of the combustion-chamber or the air-ports in the bottom (hearth) and the steam-ports in the side of the chamber.

In addition to introducing air and steam periodically through different ports laterally into the burning fuel in the producer, I sometimes introduce as a continuous blast a small quantity of air and steam into the combustion-chamber from the bottom through a perforated hearth-plate, so as to consume the fuel more completely.

Figure 2:
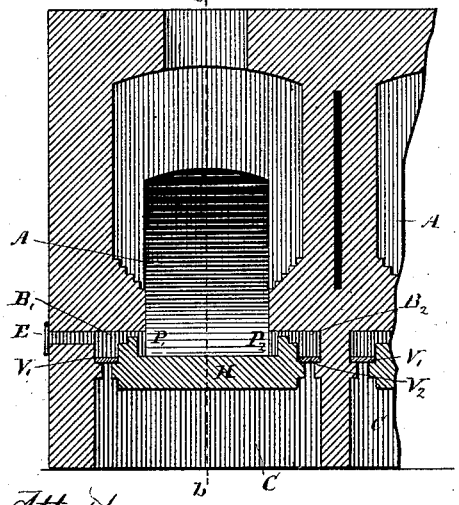
Figure 3:
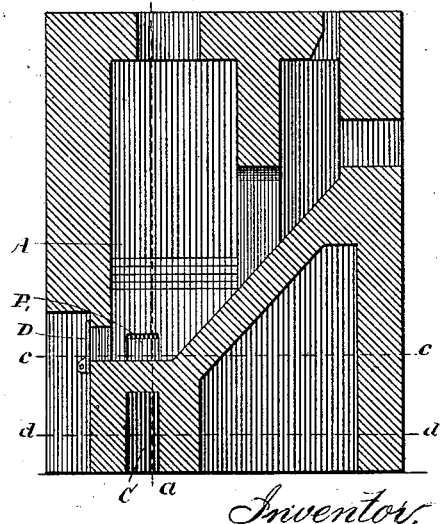
Figure 4:
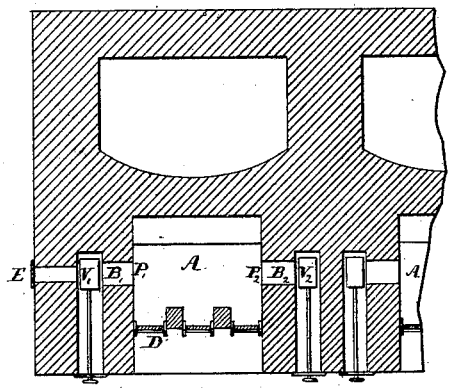
Figure 5:
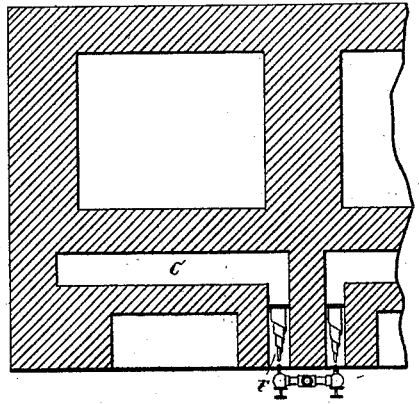
Figure 6:
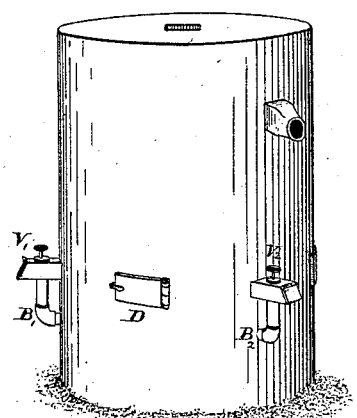
Figure 7:
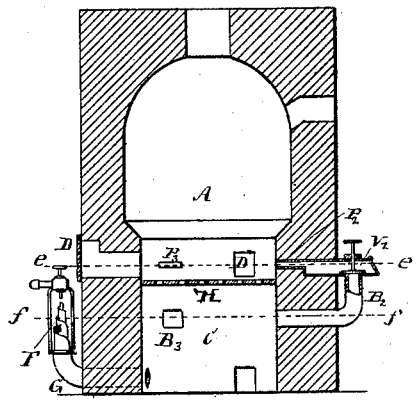
Figure 8:
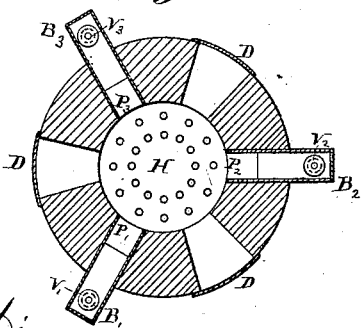
Figure 9:
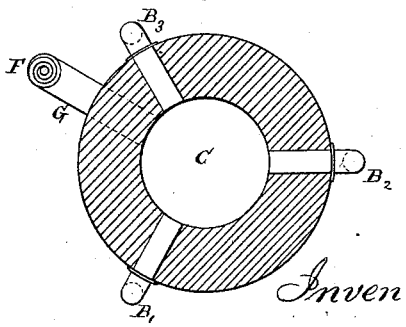
Figure 10:
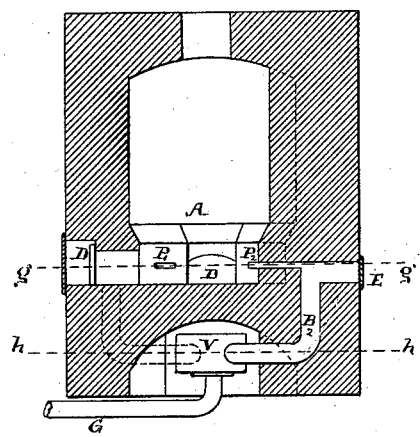
Figure 11:
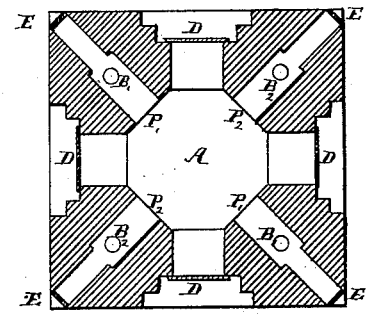
Figure 12:
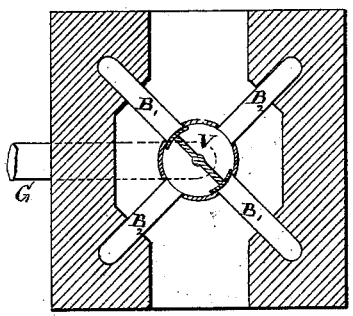
Figure 13:
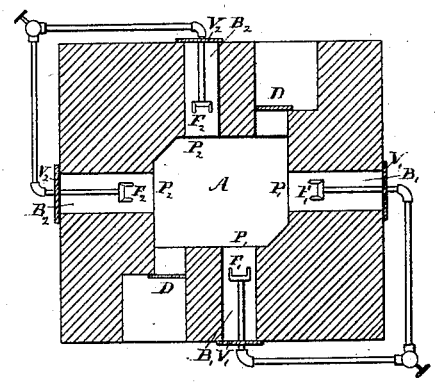

In the accompanying drawings, Figure 1 is a perspective view of three gas-producers constructed in accordance with one form of my invention, one of them being in section to show the interior arrangement of parts. Figs. 2 and 3 are vertical sectional views of the form of gas-producer shown in Fig. 1, Fig. 2 being taken on the line $a\,a$ of Fig. 3, and the section of the latter on line $b\,b$ of Fig. 2. Fig. 4 is a horizontal section of the gas-producer, taken on the line $c\,c$ of Fig. 3. Fig. 5 is a similar section taken on the line $d\,d$ of Fig. 3. Fig. 6 is a perspective view of a cylindrical gas-producer having three separate air and steam ports, independent valves in the flues leading to the latter, and a single blast or air or steam mixing chamber. Fig. 7 is a vertical sectional view of the gas-producer shown in Fig. 6, this figure showing a perforated hearth. Fig. 8 is a horizontal section taken on the line $e\,e$, Fig. 7. Fig. 9 is a horizontal section taken on the line $f\,f$ of Fig. 7. Fig. 10 is a vertical sectional view of another form of gas-producer having two sets of air and steam inlet ports, a single blast-flue, and a valve located in the latter for permitting the blast to be conducted into the combustion-chamber through two ports located diametrically opposite each other. Fig. 11 is a horizontal section taken on the line $g\,g$ of Fig. 10. Fig. 12 is a similar section taken on the line $h\,h$ of the same figure. Fig. 13 represents a horizontal section through the combustion-chamber of a gas-producer that has two sets of blast-ports arranged on opposite sides thereof, two ports being in each set, and the blast-flues communicating directly with the outside, and each blast-flue having its own blowing apparatus for drawing the steam from two main pipes, adapted one to each set of blast-ports.

The generator, in which I produce heating-gas by blowing a mixture of air and steam into the burning fuel periodically through different ports, as described, has substantially the following construction: The combustion-chamber A of the producer has in its sides, near the bottom, two or more openings, $P'\,P^2$, arranged in symmetrical order. Each one of these openings or blast-ports communicates with a blast-flue, $B'\,B^2$, which leads either directly to the outside or to a main blast-flue, G, or chamber C. Each one of these blast-flues $B'\,B^2$ is provided with a blast-valve, $V'\,V^2$, by means of which communication through them, between the combustion-chamber and the outside of the main blast flue or chamber, can be regulated or shut off. In case of the blast-flues $B'\,B^2$ leading to the outside directly, each one of them is provided with a blowing apparatus, $F'\,F^2$. In the case of the blast-flues $B'\,B^2$ connecting with a main blast-flue, G, or chamber C, only one blowing apparatus, F, is needed, and this delivers the blast into said main flue G or chamber C. The blast-chamber C, I locate underneath the combustion-chamber, and separate the two by a solid or by a perforated hearth-plate, H. When I use a main blast-flue, G, I locate it also underneath the combustion-chamber, although it may be placed around the producer-chamber, either in the brick-work or outside of it. When a main blast-flue is used, the several blast-valves may be combined into one main valve, V, located at the junction of the several blast-flues. For the purpose of cleaning the blast-ports, I provide, whenever circumstances permit, an opening, E, back of each blast-port and in a line with it, extending through the producer-wall to the outside. For the removal of ashes and clinkers, I provide one or more fire-doors, D, on a level with the hearth of the combustion-chamber and in convenient reach to the blast-ports. When the blast-valves are located near the blast-ports in the body of the brick-work, I provide them with rods reaching to the outside. Generally I connect these valves by rods, so that the motion which closes one opens another. The direction of the blast may be horizontal or slightly inclined.

Having thus described my invention, what I claim as new, and desire to secure by Letters Patent, is—

1. The process of producing water-gas, consisting in periodically blowing a mixture of steam and air in a transverse direction and at different points into a combustion-chamber containing a body of incandescent coal or carbon, and drawing off the gases continuously through the same outlets, substantially as and for the purpose herein set forth.

2. The process of producing water-gas, consisting in periodically blowing separate jets of air and steam in a transverse direction and at different points into a combustion-chamber containing a body of incandescent coal or carbon, and drawing off the gases continuously through the same outlets, substantially as and for the purpose herein set forth.

3. The process of producing water-gas, consisting in continuously blowing in a vertical direction a mixture of steam and air through a body of incandescent coal contained in a combustion-chamber, and periodically blowing steam and air in a transverse direction and at different points into said chamber, and drawing off the gases continuously through the same outlets, substantially as and for the purpose herein set forth.

4. The process of producing water-gas, consisting in continuously blowing into a chamber containing an incandescent body of coal or carbon an ascending current of a mixture of air and steam, or of air alone, and periodically blowing steam transversely into said chamber at different points thereof and drawing off the gases continuously through the same outlets, substantially as herein set forth.

5. A gas-producer having a combustion-chamber provided with blast-ports on different sides of its vertical walls, a blast or steam and air chamber arranged below the hearth of the combustion-chamber, flues communicating with the latter and with the ports of the combustion-chamber, and a valve mechanism for periodically admitting the blast through the different ports of the combustion-chamber, substantially as herein set forth.

6. A gas-producer having a combustion-chamber provided with a perforated hearth, and with blast-ports at different points of its vertical walls, and means, substantially as shown, for admitting an ascending current of steam and air, or of air alone, through the perforated hearth, and a mixture of steam and air, or of steam alone, through different ports in the walls of the combustion-chamber, substantially as herein set forth.

In testimony whereof I affix my signature in presence of two witnesses.

JOHN ZELLWEGER.

Witnesses:
FRANK COMPTON,
OLIN J. GARY.